United States Patent [19]

Hayashi et al.

[11] Patent Number: 4,674,247

[45] Date of Patent: Jun. 23, 1987

[54] SEAL ASSEMBLY FOR ATTACHMENT TO A WINDOW GLASS AND A METHOD FOR INSTALLING A WINDOW GLASS

[75] Inventors: Motomu Hayashi, Okazaki; Masayuki Nagai, Aichi; Kiyoyuki Imayoshi, Toyota, all of Japan

[73] Assignee: Toyota Jidosha Kabushiki Kaisha, Japan

[21] Appl. No.: 822,337

[22] Filed: Jan. 27, 1986

[30] Foreign Application Priority Data

Feb. 5, 1985 [JP] Japan ............................ 58-15053[U]

[51] Int. Cl.⁴ .............................................. E06B 3/00
[52] U.S. Cl. ........................................ 52/208; 52/397
[58] Field of Search ...................... 52/208, 397, 718.1; 296/84 R

[56] References Cited

U.S. PATENT DOCUMENTS

| | | | |
|---|---|---|---|
| 2,959,259 | 11/1960 | Meyer | 52/718.1 |
| 3,037,810 | 6/1962 | Kelley | 52/208 |
| 3,155,204 | 11/1964 | Campbell | 52/208 |
| 3,155,422 | 11/1964 | Campbell | 52/208 |
| 3,298,145 | 1/1967 | Minervini | 52/718.1 |
| 3,416,833 | 12/1968 | Griffin | 52/208 |
| 4,165,083 | 8/1979 | Dochnahl | . |
| 4,343,121 | 8/1982 | Kruschwitz | 52/397 |
| 4,487,448 | 12/1984 | Griffin | 296/84 R |

FOREIGN PATENT DOCUMENTS 599588 3/1948 United Kingdom ............ 296/84 R

*Primary Examiner*—Henry E. Raduazo
*Attorney, Agent, or Firm*—Parkhurst & Oliff

[57] ABSTRACT

This invention relates to a vehicle window structure. The vehicle window structure includes a window glass, a body member, a window molding, a retainer for the window molding, a seal member secured to body member and another seal member between the window glass and the seal member. The window molding is in contact with the window glass and the body member. The window molding is fixed on the retainer which supports the seal member. The another seal member is secured to an inner surface along an outer peripheral edge of the window glass. Accordingly, the window glass, a sealing assembly including the window molding, retainer and seal member and the another seal member which is secured to the window glass are united before the window glass is fixed on the vehicle body. Further, the another seal member forms a continuous sealing ring along the outer peripheral edge of the window glass to provide more secured sealing effect. Thus, the window glass, the another seal member and its sealing assembly can be attached to the body member in a simple one-step operation.

18 Claims, 6 Drawing Figures

PRIOR ART

SEAL ASSEMBLY FOR ATTACHMENT TO A WINDOW GLASS AND A METHOD FOR INSTALLING A WINDOW GLASS

TECHNICAL FIELD

The present invention relates to a vehicle window structure which seals a passenger compartment from an outside or exterior environment of a vehicle. More particularly, the present invention relates to improvements in a window glass seal member disposed between the window glass and the outer body member. The window glass seal member obviates the installation problems encountered with known devices.

BACKGROUND OF THE INVENTION

FIG. 6 shows a cross-sectional view of a conventional vehicle window structure taken along the line II—II of FIG. 1. In the conventional vehicle window structure, a surface 12 of a conventional seal member 10 is disposed on an inner surface 42 in the vicinity of a lower peripheral edge 44 of the window glass 40. Another surface 14 of the conventional seal member 10 is disposed on an outer surface 22 in the vicinity of an upper edge 24 of the outer body member 20. The upper edge 24 of the outer body member 20 defines a lower peripheral edge of a vehicle window opening. The conventional seal member 10 is fitted in the vicinity of the upper edge 24 of the outer body member 20, and is usually made of a butyrated resin.

An inner body member 90 is in contact with an inner surface 24 of the outer body member 20. The outer body member 20 has a hole 26 in the vicinity of the upper edge 24 thereof, and the inner body member 90 has a corresponding hole 92 in the vicinity of an upper edge thereof. The hole 26 of the outer body member 20 is congruent with the hole 92 of the inner body member 90. A retainer 80 is fixed on the outer body member 20 through a bolt and a nut. The bolt is inserted into a hole 82 of the retainer 80, the hole 26 of the outer body member 20 and the hole 92 of the inner body member 90. The retainer 80 has a flange 84 on which a window molding 50 is mounted through a screw 52. An upper edge 54 of the window molding 50 is in contact with an outer surface 46 of the window glass 40, and a lower edge 56 of the window molding 50 is in contact with the outer body member 20. The window molding 50 improves the aesthetic appearance around the window glass 40.

A packing 70 is disposed between the outer surface 22 of the outer body member 20 and an inner surface 86 of the retainer 80 for preventing the retainer 80 from hitting or contacting the outer surface 22 of the outer body member 20. The packing 70 is disposed under the conventional seal member 10, and a space is defined between the packing 70 and the conventional seal member 10. If the conventional seal member 10 is mounted on the packing 70, the sealing effect of the seal member 10 is detracted. Because, an area of the another surface 14 of the conventional seal member 10 is reduced, and a gap is defined between the another surface 14 of the conventional seal member 10 and the packing 70. Accordingly, the upper edge 24 of the outer body member 20 extends considerably upward beyond the hole 26 to provide the space between the packing 70 and the seal member 10. As a result, a vehicle cannot have a large window, and a wide field of view for passengers cannot be obtained.

The installation procedure for installing the conventional window structure is cumbersome. When these components are installed on the body member, first of all, the packing 70 is first fixed on the outer body member 20 and the conventional seal member 10 is then mounted on the outer surface 22 of the outer body member 20. Thereafter the door glass 40 is mounted on the conventional seal member 10. Finally, the window molding 50 and the retainer 80 are fixed on the outer body member 20 by the bolt and the nut.

Accordingly, the packing 70, the conventional seal member 10, the window molding 50 and the retainer 80 are separated from the window glass 40, so that these components must be installed piece by piece. As a result, installation entails a substantial amount of time and effort.

Another type of conventional window structure is disclosed in U.S. Pat. No. 4,165,083 to Dochnaki. The '083 patent discloses a sealing member having two side-by-side oppositely facing channels, one of which surrounds a peripheral edge of a window glass, while the other fits over a flange surrounding the window opening of the vehicle. The window and sealing member are first installed on the vehicle and then retaining clips are secured to the vehicle body to press the sealing member and glass against the flange. Thereafter, a decorative beading cover is attached to the retainer.

The '083 patent suffers from many of the disadvantages noted in connection with the window structure of FIG. 6. For example, the installation process of the window structure disclosed in the '083 patent is cumbersome since it entails a piece-by-piece installation. In addition, the flange of the '083 patent must have a height sufficient to support the channel of the sealing member, the height of the flange thus decreasing the field of view through the window.

SUMMARY OF THE INVENTION

The present invention was developed in view of the foregoing background and to overcome the foregoing drawbacks. It is accordingly an object of this invention to provide a seal member which can be installed easily on a vehicle by a factory worker and which provides more secured sealing effect.

To achieve such easy installation of a window glass and more secured sealing effect, the present invention provides a seal member, another seal member and a window molding which are mounted on the window glass, before the window glass is mounted on the vehicle.

In accordance with the present invention, the seal member includes a head portion and an extending portion both of which cooperate with a retainer and the head portion is formed integrally with the extending portion. The head portion of the seal member has an outer surface and an inner surface. The extending portion of the seal member extends downward from the head portion along an inside surface of the retainer. A bolt is inserted into aligned holes in the extending portion of the seal member and in the retainer. Accordingly, the retainer and the bolt are assembled with the seal member.

The another seal member includes an outer surface and an inner edge.

Furthermore, the window molding is fixed on the retainer by a screw. The retainer, seal member and window molding are assembled together or united to form a sealing assembly. The another seal member is secured to an inner surface of the window glass before the sealing assembly is secured to the window glass. The window glass is sandwiched between the window molding, and the another seal member and the another seal member is sandwiched between the window glass and the head portion of the seal member. Accordingly, the retainer, the bolt, the seal member, the another seal member and the window molding are assembled as a unit in the vicinity of the peripheral edge of the window glass and the another seal member is secured to the whole peripheral edge of the window glass, before the window glass is mounted on the body member.

Therefore, when the bolt is inserted into a hole of the body member and the bolt is secured by a nut, the window glass is securely mounted on the body member and sealing effect between the window glass and the body member becomes more secured. By providing a seal member and another seal member according to this invention, much less time and labor is expended to install the window glass. This provides for increased productivity and decreased production costs. Thus, this invention is a significant contribution to the industry.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein.

DETAILED DESCRIPTION OF THE PREFERRED EMBODIMENT

The present invention will be described in detail with reference to the accompanying drawings which illustrate a preferred embodiment of the present invention.

Figure 4:
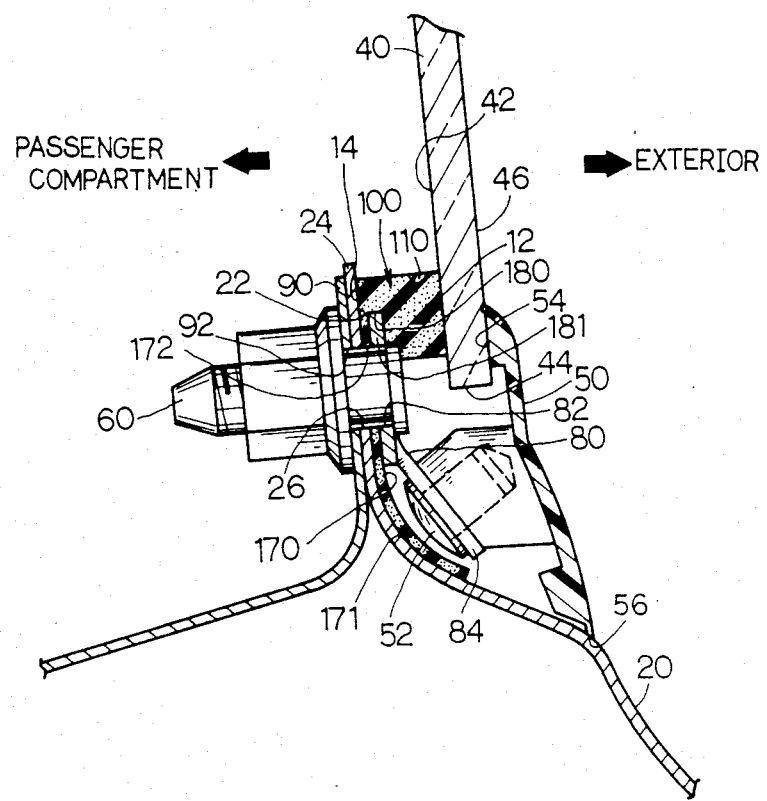
FIG. 4 is an enlarged cross-sectional view of a previously proposed vehicle window structure, taken along the line II—II in FIG. 1.
Figure 5:
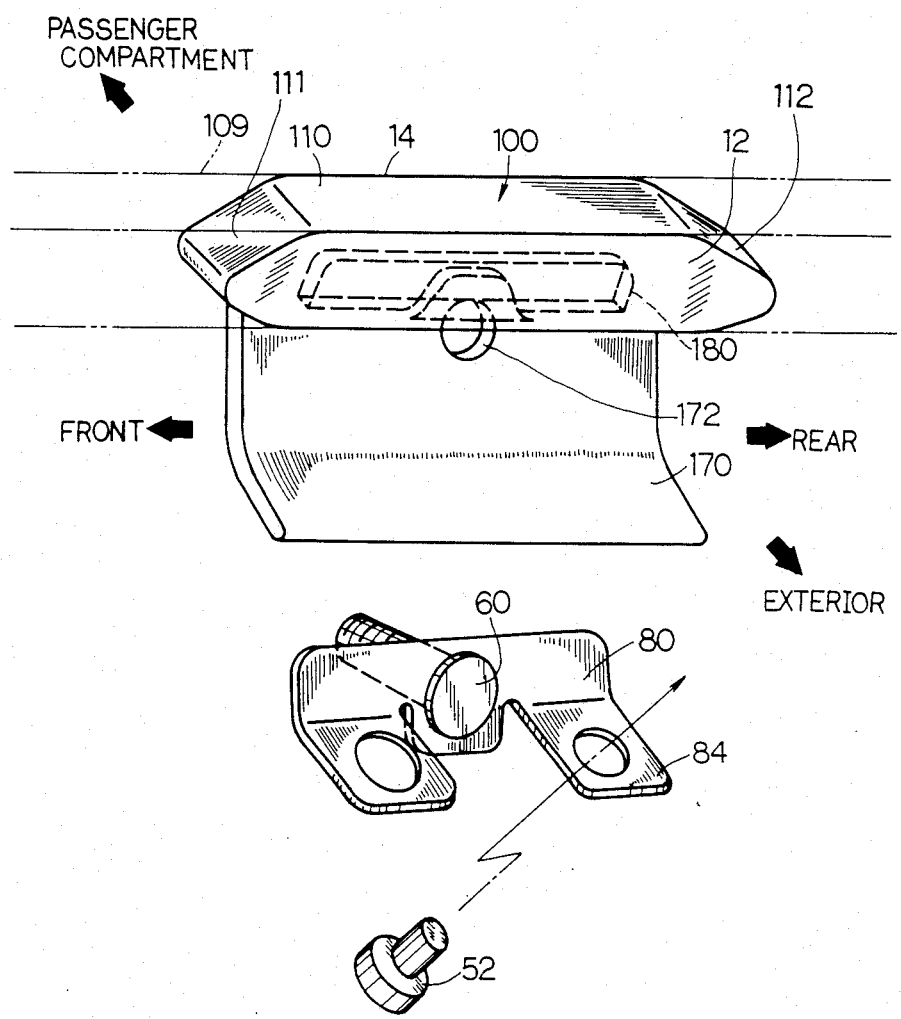
FIG. 5 is an exploded perspective view of a seal member, another seal member and retainer in accordance with the previously proposed vehicle window structure.

FIGS. 4 and 5 show a previously proposed vehicle window structure, which is filed on May 30, 1985 and is U.S. patent application Ser. No. 739,388. The previously filed application was assigned to the same assignee as the assignee of this application.

The previously proposed vehicle window structure includes a seal member 100 and a window 50 molding which are mounted on the window glass 40, before the window glass 40 is mounted on the vehicle. And the seal member 100 is provided with a lower extension 170 for preventing a retainer 80 from hitting an outer surface of the outer body member 20.

Further, the seal member 100 includes a head portion 110 and an extending portion 170 both of which cooperate with a retainer 80. The head portion 110 of the seal member 100 has an outer surface, an inner surface and a recess 180 located between the inner and outer surfaces. The extending portion 170 of the seal member 100 extends downward from the head portion 110 along an inside surface of the retainer 80. An upper edge 181 of a retainer 80 is inserted into the recess 180 of the head portion 110 of the seal member 100, and a bolt 60 is inserted into aligned holes 172 and 82 in the extending portion 70 of the seal member 100 and in the retainer 80. Accordingly, the retainer 80 and the bolt 60 are assembled with the seal member 100.

Furthermore, the window molding 50 is fixed on the retainer 80 by a screw 52. The retainer 80, seal member 100 and window molding 50 are assembled together or united to form a sealing assembly. The window glass 40 is sandwiched between the window molding 50 and the head portion 110 of the seal member 100. Accordingly, the retainer 80, the bolt 60, the seal member 100, and the window molding 50 are assembled as a unit in the vicinity of the peripheral edge 44 of the window glass 40, before the window glass 40 is mounted on the body member 20 and 90.

Therefore, when the bolt 60 is inserted into holes 26 and 92 of the body members 20 and 90 and the bolt 60 is secured by a nut, the window glass 40 is securely mounted on the body members 20 and 90. By providing a seal member 100, less time and labor is expended to install the window glass.

However, the installation procedure for installing the previously proposed vehicle window structure is still cumbersome. Because an another seal member 109 shown by a broken line in FIG. 5 should be fixed on an interior surface 42 of the window glass 40 and or the outer body member 20 and both ends of the another seal member 109 should be securely connected to both ends 111 and 112 (i.e. front and rear ends) of the head portion 110 of the seal member 100 to prevent water from leaking in a passenger compartment.

Accordingly, in the previously proposed vehicle window structure, the sealing assembly, including the retainer 80, the seal member 100 and the window molding 50, and the window glass 40 are united, but the another seal member 109 is separated from a unit including the sealing assembly and the window glass 40.

As a result, they must be installed separately, and then installation still entails a substantial amount of time and effort.

Further, if the another seal member 109 were not completely connected to the seal member 100, water might leak in the passenger compartment.

To prevent water from leaking in the passenger compartment, an idea is previously proposed. The idea is that the another seal member 109 is formed integrally with the head portion 110 of the seal member 100.

However, it is very difficult to produce a seal member integrally formed with the seal member 100 and the another seal member 109.

Figure 1:
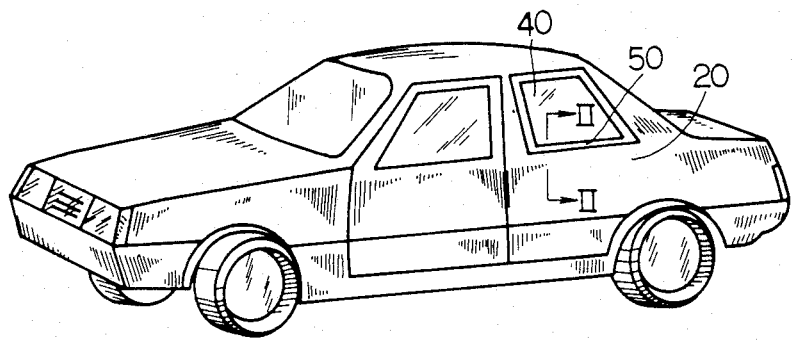
FIG. 1 is a perspective view of a vehicle.
Figure 2:
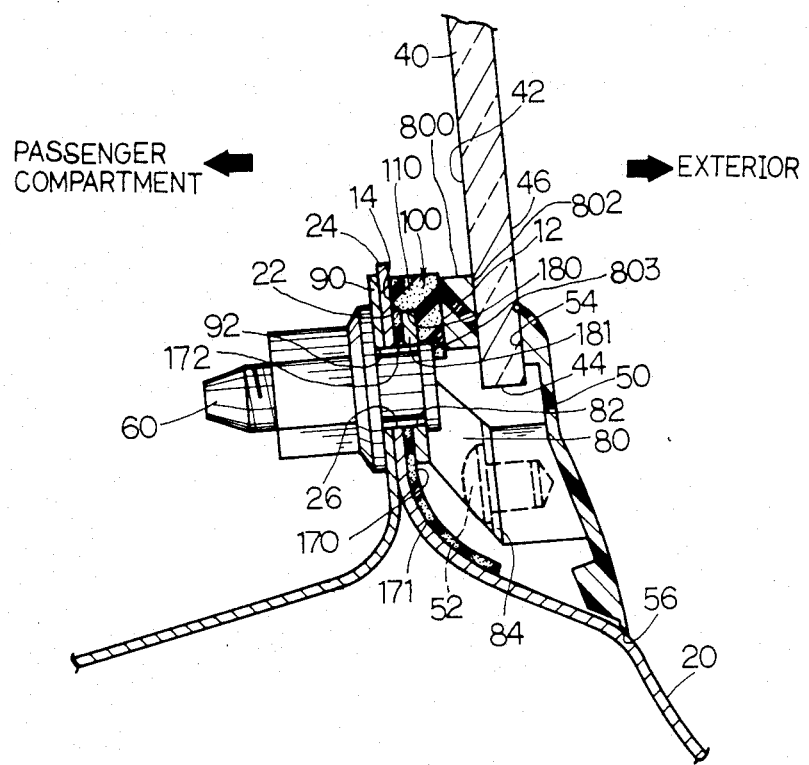
FIG. 2 is an enlarged cross-sectional view of a vehicle window structure according to the present invention, taken along the line II—II in FIG. 1.
Figure 3:
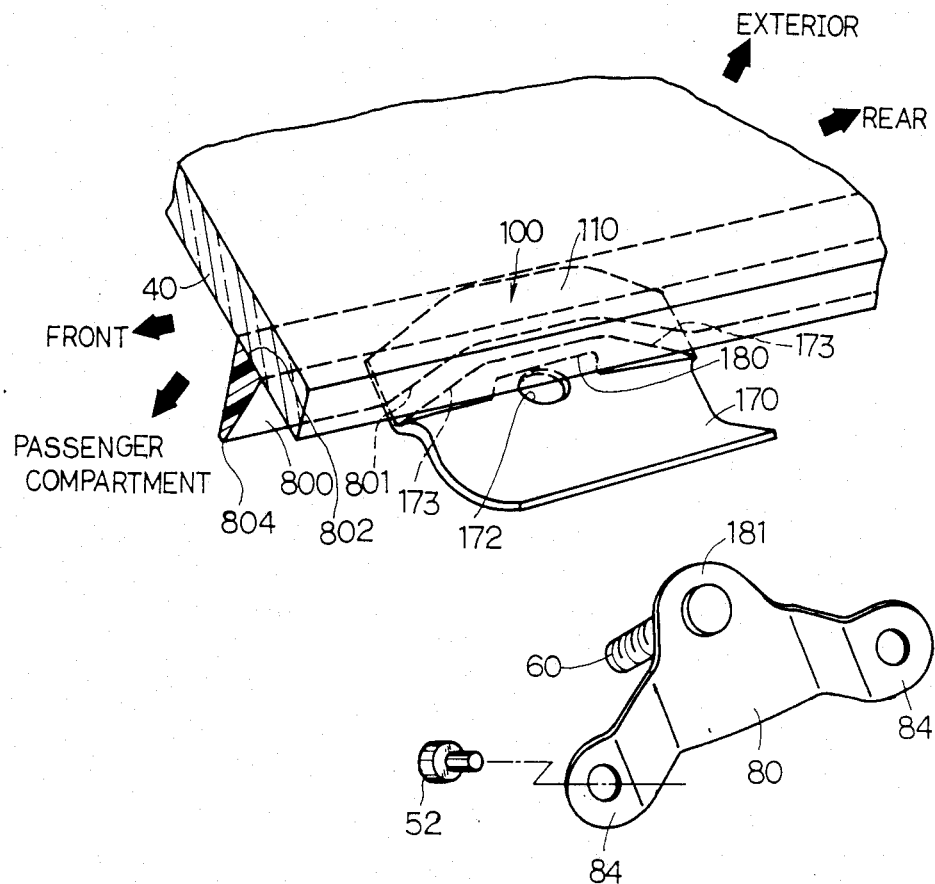
FIG. 3 is an exploded perspective view of a seal member, another seal member and retainer in accordance with the invention.

FIGS. 1 through 3 show the seal assembly for attachment to a window glass according to the present invention.

Referring to FIG. 1, a window glass 40 is mounted on an outer body member 20, and a window molding 50 is mounted on an outer peripheral portion of the window glass 40 and an inner peripheral portion of the body member 20.

As shown in FIG. 2, the outer peripheral portion of the window glass 40 is sandwiched between the window molding 50 and another seal member 800. The another seal member 800 includes an outer surface 802 and an inner surface 803. The another seal member 800 is sandwiched between an inner surface 42 of the window glass 40 and a head portion 110 of a seal member 100. The seal member 100 includes the head portion 110 and an extending portion 170. The head portion 110 of the seal member 100 has an outer surface 12, an inner surface 14 and a recess 180 therebetween. The extending portion 170 has a hole 172 therein. A bolt 60 is inserted into a hole 82 of a retainer 80 and the hole 172 of the seal member 100, and an upper portion of the retainer 80 is inserted into the recess 180.

Accordingly, the bolt 60 and the retainer 80 are assembled with the seal member 100 prior to installment on the vehicle. Once installed, the seal member 100 will serve a dual function of sealing a space between the another seal member 800 and retainer 80, and providing the extending portion 170 between the retainer 80 and outer body member 20.

Further, the another seal member 800 is secured to an inner surface 42 along a whole outer peripheral edge of the window glass 40 and the window molding 50 is fixed on a flange 84 of the retainer 80 by a screw 52. An outer peripheral edge 44 of the window glass 40 and the another seal member 800, which is secured to the inner surface 42 of the window glass 40, are inserted between an edge 54 of the window molding 50 and the outer surface 12 of the head portion 110 of the seal member 100. The outer surface 12 of the seal member 100 is in contact with an inner surface 803 of the another seal member 800 and the outer surface 802 of the another seal member 800 is in contact with the inner surface 42 of the window glass 40. The edge 54 of the window molding 50 is in contact with an outer surface 46 of the window glass 40.

Accordingly, before the window glass 40 is mounted on the outer body member 20, the seal member 100, the another seal member 800, the retainer 80, the bolt 60 and the window molding 50 are assembled into a sealing assembly located about the outer peripheral edge 44 of the window glass 40. The window glass 40, the another sealing member 800 and sealing assembly form a unit of a vehicle window structure and then it is attached to the vehicle body by inserting the bolt 60 through the hole 26 of the outer body member 20 and the hole 92 of the inner body member 90, and fixing the bolt 60 with a nut or other suitable fastener. Therefore, the window structure of the window glass 40, seal member 100, another seal member 800, retainer 80, bolt 60 and window molding 50 are secured to the vehicle in a relatively simple, one-step process.

As shown in FIG. 3, the another seal member 800 includes an inner edge 804. A niche 801 is formed when the seal member 100 is pressed to the inner edge 804 of the another seal member 800, and the seal member 100 includes both tapered surfaces 173 to make more secured sealing effective between the seal member 100 and the another seal member 800.

When the window glass 40 is fixed to the outer body member 20, the inner edge 804 of the another seal member 800 is pressed to the outer surface 22 of the outer body member 20, and the another seal member 800 seals securely a space between the inner surface 42 of the window glass 40 and the outer surface 22 of the outer body member 20 along the outer peripheral edge of the window glass 40.

The extending portion 170 has a lower extention 171, which extends downwardly underneath at least a lower end of the flange 84 of the retainer 80, so that the extending portion 170 can protect the outer body member 20 from being hit by the retainer 80 or the screw 52.

When the bolt 60 is inserted into a hole 26 of the outer body member 20 and a hole 92 of an inner body member 90, and the bolt 60 is securely fixed on the outer body member 20 by a nut, an opposite edge 56 of the window molding 50 is in contact with the outer body member 20. Accordingly, the aesthetic appearance of the window glass 40 is improved. In this condition, the inner surface 14 of the head portion 110 and the extending portion 170 of the seal member 100 and the inner edge 804 of the another seal member 800 are pressed to an outer surface 22 of the outer body member 20.

Figure 6:
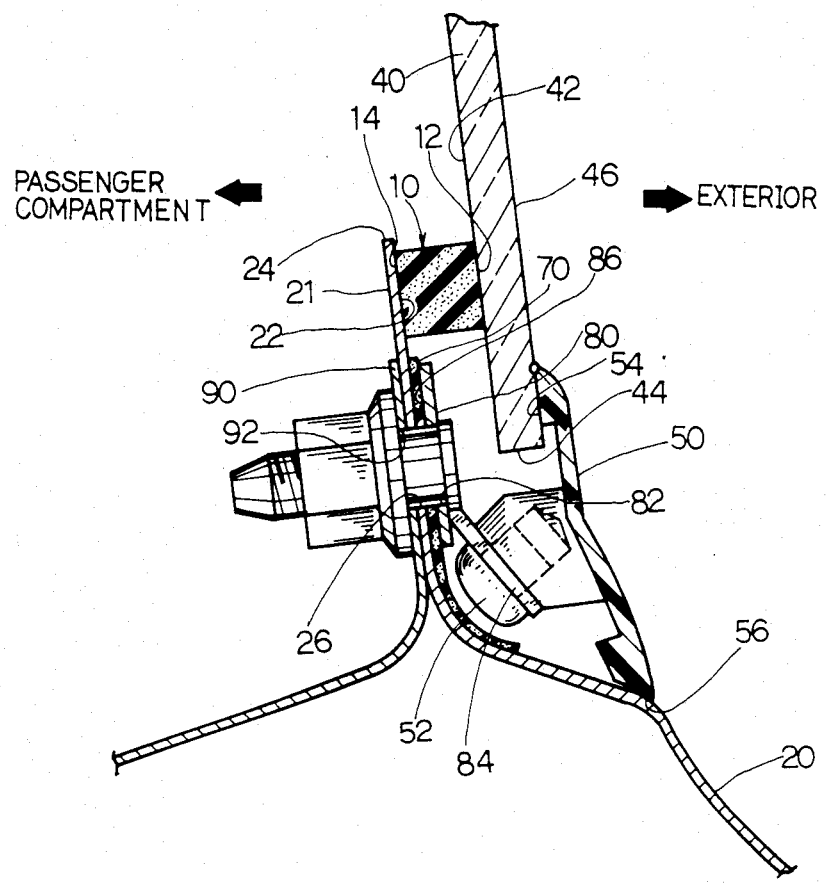
FIG. 6 is an enlarged cross-sectional view of a conventional vehicle window structure, taken along the line II—II in FIG. 1.

As shown in FIG. 2, the head portion 110 of the seal member 100 includes the recess 180, and a portion of the bolt 60 is inserted into the recess 180. Accordingly, a distance defined between the bolt 60 and an upper end of the seal member 100 is shorter than the distance of a conventional vehicle window structure shown in FIG. 6.

Therefore, a vertical distance of a mounting portion of the outer body member 20 for mounting the seal member 100 is narrower than the vertical distance of a mounting portion of the conventional vehicle window structure. Accordingly, an inner peripheral edge 24 of the outer body member 20 is lower than conventional window structures, and thus improves passenger visability by permitting a larger window opening.

Further, the seal member 100 is fixed on the outer body member 20 by the bolt 60, so that the seal member 100 and the another seal member 800 seal more securely between the outer surface 22 of the outer body member 20 and the window glass 40 than the conventional vehicle window structure.

The seal member 100 may be sponge rubber, and the another seal member 109 may be made of a butyrated resin.

Furthermore, to produce the seal member 100 and the another seal member 800 more efficiently, the seal member 100 and the another seal member 800 are respectively produced.

The extending portion 170 of the seal member 100 may be made of an elastic unfoamed rubber. In additio, the extending portion 170 of the seal member 100 may be enlarged as shown in FIG. 3.

As described herein, the present invention provides a seal member and another seal member affixed to a window glass prior to installing the window glass on a body member. The present invention thus simplifies the window glass installment procedure, while forming an adequate seal and increasing passenger visibility. Further, the present invention provides more secured sealing effect between the window glass and the body member.

While the present invention has been described in its preferred embodiment, it is to be understood that the invention is not limited thereto, and may be otherwise embodied within the scope of the following claims.

What is claimed is:

1. A window structure for a vehicle comprising:
   a window glass having an inner surface and an outer surface;
   a window molding having an inner surface and an outer surface and a first edge and a second edge;

a retainer having a flange portion, said flange portion being secured to said inner surface of said window molding;

a first seal member having an inner surface and an outer surface, a head portion and an extending portion, said first seal member being secured to said retainer;

a second seal member having an inner surface and an outer surface, said outer surface of said second seal member being secured to said inner surface of the window glass and said inner surface of said second seal member being secured to said outer surface of said first seal member at said head portion thereof; and fastening means secured to said retainer for securing said window glass to said vehicle, said window glass, window molding, retainer, first seal member, second seal member and fastening means forming an integral structure which is fitted into said vehicle.

2. A window structure of claim 1, wherein said head portion of said first seal member includes a sealing portion and said outer surface of said first seal member is located on said sealing portion, said extending portion being formed integrally with said sealing portion.

3. A window structure of claim 2, wherein said sealing portion of said first seal member includes a recess for receiving a portion of said retainer.

4. A window structure of claim 2, wherein said fastening means secures said extending portion of said first seal member to said retainer, said extending portion being located between said retainer and said vehicle body when said window glass is secured to said vehicle body.

5. A window structure of claim 4, wherein said extending portion includes an extension that extends toward said flange such that said extension is located between said flange and vehicle body when said window glass is attached to said vehicle body.

6. A window structure of claim 4, wherein said extending portion includes an opening for reception of said fastening means to secure said seal member to said retainer.

7. A window structure of claim 6, wherein said opening in said extending portion is aligned with a hole in said vehicle body, said fastening means being inserted through said aligned opening and hole to secure said window glass to said vehicle body.

8. A window structure of claim 15, wherein said second seal member is secured to said inner surface of said window glass along an outer peripheral edge thereof, whereby said second seal member forms a continuous sealing ring between the inner surface of the window glass and an outer surface of said vehicle body when said window glass is secured to said vehicle body.

9. A window structure of claim 8, wherein said second seal member includes a portion which is in contact with said outer surface of said vehicle body when said window glass is secured to said vehicle body.

10. A window structure for a vehicle comprising:

a window glass having an inner surface and an outer surface;

a window molding having an inner surface and an outer surface and a first edge and a second edge;

a retainer having a flange portion, said flange portion being secured to said inner surface of said window molding;

a first seal member having an inner surface and an uter surface, a head portion and an extending portion, said first seal member being secured to said retainer;

a second seal member having an inner surface and an outer surface, said outer surface of said second seal member being secured to said inner surface of the window glass and said inner surface of said second seal member being secured to said outer surface of said first seal member at said head portion thereof, said head portion being located across said glass at an opposite corresponding position to said first edge portion of said window molding; and fastening means secured to said retainer for securing said window glass to said vehicle, said window glass, window molding, retainer, first seal member, second seal member and fastening means forming an integral structure which is fitted into said vehicle.

11. A window structure of claim 10, wherein said head portin of said first seal member includes a sealing portion and said outer surface of said first seal member is located on said sealing portion, said extending portion being formed integrally with said sealing portion.

12. A window structure of claim 11, wherein said sealing portion of said first seal member includes a recess for receiving a portion of said retainer.

13. A window structure of claim 10, wherein said fastening means secures said extending portion of said first seal member to said retainer, said extending portion being located between said retainer and said vehicle body when said window glass is secured to said vehicle body.

14. A window structure of claim 13, wherein said extending portion includes an extension that extends toward said flange such that said extension is located between said flange and vehicle body when said window glass is attached to said vehicle body.

15. A window structure of claim 13, wherein said extending portion includes an opening for reception of said fastening means to secure said seal member to said retainer.

16. A window structure of claim 15, wherein said opening in said extending portion is aligned with a hole in said vehicle body, said fastening means being inserted through said aligned opening and hole to secure said window glass to said vehicle body.

17. A window structure of claim 10, wherein said second seal member is secured to said inner surface of said window glass along an outer peripheral edge thereof, whereby said second seal member forms a continuous sealing ring between the inner surface of the window glass and an outer surface of said vehicle body when said window glass is secured to said vehicle body.

18. A window structure of claim 17, wherein said second seal member includes a portion which is in contact with said outer surface of said vehicle body when said window glass is secured to said vehicle body.

* * * * *